United States Patent [19]

Cooper et al.

[11] Patent Number: 5,601,798
[45] Date of Patent: Feb. 11, 1997

[54] PROCESS FOR PREPARING ZEOLITE Y WITH INCREASED MESOPORE VOLUME

[75] Inventors: David A. Cooper, Morrisville; Thomas W. Hastings, Barto, both of Pa.; Elliot P. Hertzenberg, Wilmington, Del.

[73] Assignee: PQ Corporation, Valley Forge, Pa.

[21] Appl. No.: 298,158

[22] Filed: Aug. 30, 1994

Related U.S. Application Data

[63] Continuation-in-part of Ser. No. 116,635, Sep. 7, 1993, abandoned, and Ser. No. 117,776, Sep. 8, 1993, abandoned.

[51] Int. Cl.$^6$ .................................................. C01B 39/24
[52] U.S. Cl. .................. 423/700; 423/713; 423/714; 423/716; 423/DIG. 21; 502/79
[58] Field of Search ..................... 423/700, 713, 423/714, 716, DIG. 21; 502/79

[56] References Cited

U.S. PATENT DOCUMENTS

| | | | |
|---|---|---|---|
| 3,374,056 | 3/1968 | Maher et al. | 423/DIG. 21 |
| 3,691,099 | 9/1972 | Young | 423/714 |
| 3,929,672 | 12/1975 | Ward . | |
| 4,269,815 | 5/1981 | Lim et al. | 502/79 |
| 4,663,025 | 5/1987 | Fu . | |
| 4,668,649 | 5/1987 | Hoek et al. | 502/79 |
| 4,857,170 | 8/1989 | Hoek et al. . | |
| 4,857,171 | 8/1989 | Hoek et al. | 208/111 |
| 4,874,729 | 10/1989 | Klazinga | 502/79 |
| 4,874,730 | 10/1989 | Klazinga | 502/79 |
| 4,879,019 | 11/1989 | Ward . | |
| 5,013,699 | 5/1991 | Vassilakis et al. | 502/73 |
| 5,059,567 | 10/1991 | Linsten et al. | 502/64 |
| 5,069,890 | 12/1991 | Dai et al. | 423/716 |
| 5,087,348 | 2/1992 | Dai et al. | 208/111 |
| 5,112,473 | 5/1992 | Dai et al. | 208/120 |
| 5,143,878 | 9/1992 | Dai et al. | 502/66 |
| 5,190,903 | 9/1993 | Steigleder . | |
| 5,227,352 | 7/1993 | Tsujii et al. | 502/79 |
| 5,242,677 | 9/1993 | Cooper et al. | 423/714 |
| 5,288,396 | 2/1994 | Ward . | |

FOREIGN PATENT DOCUMENTS

| | | | |
|---|---|---|---|
| 0047720 | 8/1991 | Australia | 502/79 |
| 0972831 | 10/1964 | United Kingdom . | |
| WO91/17829 | 11/1991 | WIPO . | |

*Primary Examiner*—Mark L. Bell
*Assistant Examiner*—David Sample
*Attorney, Agent, or Firm*—Ernest G. Posner

[57] ABSTRACT

The mesopore volume in pores of diameters ranging from 2 to 60 nm of zeolite Y materials is increased by the hydrothermal treatment of such zeolites at temperatures above the atmospheric boiling point of the treating solution. Unique zeolites are produced as result of such process.

21 Claims, No Drawings

PROCESS FOR PREPARING ZEOLITE Y WITH INCREASED MESOPORE VOLUME

This application is a continuation-in-part of applicants' U.S. patent applications Ser. No. 08/116,635 filed Sep. 7, 1993, now abandoned, and Ser. No. 08/117,776 filed Sep. 8, 1993, now abandoned.

BACKGROUND OF THE INVENTION

This invention relates to zeolites that are useful as catalyst supports. In particular, it involves a zeolite Y product with an increased mesopore volume and the process for preparing such zeolite.

Many conversion processes in the petroleum industry are carried out using catalysts having zeolites with the structure of zeolite Y as a major component. In many cases the zeolite Y has been subjected to certain stabilizing and/or dealumination process steps during its preparation that result in the zeolite having a reduced unit cell constant ($a_o$) and an increased silica to alumina ratio. In general, there are found three classes of these stabilized zeolites Y; the ultrastable zeolites Y ("USY"), the very ultrastable zeolites Y ("USY"), and the superdealuminated ultrastable zeolites Y ("SDUSY"). These stabilized zeolites, as well as the as-synthesized zeolite Y, do not have many pores that are larger than about 2 nanometers (nm) in diameter, such "mesopores" typically having diameters of 2 to 60 nm. Limited mesopore volume within the 2 to 60 nm pore diameter range can be a decided disadvantage when such catalysts are used for processes that tend to coke the catalysts. Examples of such processes are cracking or hydrocracking of heavy crude oils.

The as-synthesized zeolite Y (referred to herein simply as "Y") has a unit cell constant greater than 24.6 up to 24.85 angstroms (Å). These as-synthesized materials have a mesopore volume of less than about 0.05 cc/g. The ultrastable Y zeolite (USY) has a reduced unit cell constant of 24.5 to 24.6Å. These USY type materials have a mesopore volume of less than about 0.17 cc/g. The very ultrastable zeolite Y (VUSY) has a reduced unit cell constant of greater than about 24.27 (approximately 24.3) to less than 24.5Å. The VUSY type materials have a mesopore volume of less than about 0.22 cc/g. The superdealuminated ultrastable zeolite Y (SDUSY) has a reduced unit cell constant of about 24.27Å or less. These SDUSY type materials have a mesopore volume of less than about 0.25 cc/g.

U.S. Pat. Nos. 5,069,890 and 5,087,348 teach a method of preparing a zeolite with the Y structure with a secondary pore volume as high as 0.20 cc/g. These patents teach that secondary pores are 10 to 60 nm in diameter. The method consists of steam calcining previously dealuminated zeolite Y at high temperatures for long periods of time, typically 16 to 24 hours. Since the dealuminated zeolite Y starting material would have been prepared with one or more steam calcinations, at least two steam calcinations are necessary to provide the product with the slight secondary pore volume increase. In the preparation of these products described in the patent examples, the $SiO_2/Al_2O_3$ ratio of the zeolite is increased as a result of the process.

U.S. Pat. No. 5,112,473 teaches a similar small increase in the so-called secondary pore volume by a method involving the acid treatment of dealuminated zeolite Y having $a_o$ measurements of 24.3 to 24.5Å.

It is an object of this invention to prepare zeolites with a structure of zeolite Y having increased mesopore volume in pores having diameters of 2 to 60 nm when compared to similar zeolites prepared using conventional processes. It is also an object of this invention to provide such increased mesopore volume by a process not involving calcining with steam.

SUMMARY OF THE INVENTION

We have found that hydrothermal aqueous solution treatment of zeolites with the structure of zeolite Y can increase the number of pores larger than 2 nm so that the mesopore volume is drastically increased. Essentially the zeolite is contacted with an aqueous solution of dissolved solutes at high temperature, above the atmospheric boiling point of the solution, and under sufficient pressure to maintain the solution at least partially in the liquid state for a period of time necessary to provide the desired modification.

Our product differs from the prior art in that the mesopore volumes achieved are greater than zero, say about 0.05 cc/g or greater, for the as-synthesized and unstabilized and/or non-dealuminated zeolite Y; greater than about 0.17 cc/g for the ultrastable zeolites Y (USY); greater than about 0.22 cc/g for the very ultrastable zeolites Y (VUSY); and greater than about 0.25 cc/g for the super-dealuminated ultrastable zeolites Y (SDUSY).

Our process differs from the prior art in that the mesopore volumes are achieved by a process other than steam. Our process allows the $SiO_1/Al_2O_3$ ratio to be maintained or controlled. The most important variables to provide increased mesopore volume appear to be the time/temperature and pH.

THE INVENTION

The term "hydrothermal treatment or process" as used herein refers to a treatment or process involving contact with an aqueous solution wherein at least part of the solution is maintained in the liquid state. "Liquid hydrothermal" is used synonymously with "hydrothermal" herein.

The term "mesopore volume" as used herein refers to the pore volume found with pores having pore diameters ranging from 2 to 60 nm.

The high mesopore volume products of our invention are prepared from zeolites having the structure of zeolite Y which are synthetic faujasite materials. For the purpose of describing our invention, the zeolites having the structure of Y are divided into four broad classes: (a) the as-synthesized zeolite Y prior to stabilization and/or dealumination (referred to herein as "Y"); (b) ultrastable zeolites Y (referred to herein as "USY"); (c) very ultrastable zeolites Y (referred to herein as "VUSY"); and (d) superdealuminated ultrastable zeolites Y (referred to herein as "SDUSY").

In the application of our process a zeolite from one of the four classes of zeolites having the structure of zeolite Y is contacted hydrothermally with an aqueous solution having dissolved therein one or more salts, acids, bases and/or water soluble organic compounds at a temperature above the boiling point of the solution at atmospheric pressure (referred to herein as "atmospheric boiling point") for a period sufficient to provide said zeolite with an increased mesopore volume in mesopores having diameters of about 2 nm to about 60 nm then separating, washing and recovering the product. The product will generally have unit cell sizes and $SiO_2/Al_2O_3$ ratios in the same general range as the starting materials, although there may be small differences. For example, hydrothermal treatments at low pH may increase the $SiO_2/Al_2O_3$ ratio and can cause a small decrease in unit cell size. The product of our process may be further subjected to stabilization, dealumination and/or other steps which may change the unit cell size and the $SiO_2/Al_2O_3$ ratio.

The temperature of the hydrothermal treatment will be above the atmospheric boiling point of the hydrothermal treating solution. Typically, this will be about 110° C. or more, preferably about 115° C. or more. More elevated temperatures such as about 125° C. and above and about 135° C. and above, such as from about 135° C. to about 250° C., are also suitable. The upper temperature is limited by the equipment used, but temperatures in excess of 250° C. appear to be useful. Since these hydrothermal contacts are carried out above boiling, pressure equipment is required. Ultrahigh pressure condition treatments could provide suitable results at temperatures greater than 200° C. up to 400° C. Accordingly, temperature treatments ranging from 110 to 400° C. could provide suitable materials. While optimum treatment temperature will depend upon the particular class of zeolite Y being processed, the treatment or contact treatment will in general range from above atmospheric boiling point of the hydrothermal treating solution to about 250° C., preferably from about 115° C. to about 250° C. Good results are obtained at a temperature ranging from about 140° C. to about 200° C.

The time of treatment has an inverse relationship to the temperature of treatment, higher temperatures needing shorter time to effect the same degree of mesopore volume increase. At low temperatures, such as 110° C., treatment times as long as 72 hours are required to provide slightly increased mesopore volume compared to those of the prior art processes. At the most elevated temperatures, treatment times as short as 5 minutes can be used. In general, treatment times of about 5 minutes to about 24 hours, more preferably from about 2 hours or more, preferably from about 2 hours to about 10 to 20 hours are used.

The time-temperature applied during the treatment is generally such as to provide a mesopore volume in the final product at least five percent (5%) and preferably at least ten percent (10%) greater than the mesopore volume of the starting zeolite.

The hydrothermal contacting solution in general comprises an aqueous solution having dissolved therein one or more salts, acids, bases and/or water soluble organic compounds. The salts comprise, inter alia, water soluble salts such as ammonium, including quaternary ammonium, alkali and alkaline earth salts of strong and weak acids, both organic and inorganic acids. Non-limiting examples of desirable salts include the nitrate, chloride and sulfate salts of ammonia, and alkali metal, such as sodium and potassium. Non-limiting examples of acids include the inorganic acids such as the strong acids nitric, sulfuric and hydrochloric acid, as well as organic acids such as acetic and formic acids. Non-limiting examples of bases include inorganic bases such as ammonium, alkali and alkaline earth metal hydroxides as well as organic bases such as quaternary ammonium hydroxides, amine complexes, pyridinium salts and the like. Non-limiting examples of water soluble organic compounds include the lower alcohols, ethers and the like. Preferred salts are the ammonium and alkali metal salts, particularly the salts of strong inorganic acids, such as the preferred nitric acid. Preferred acids are the inorganic acids such as nitric, sulfuric and hydrochloric acids, preferably nitric acid. The concentration and amount of the solution contacted with the stabilized zeolite Y is adjusted to provide at least 0.1 part by weight ("pbw") of the dissolved solute for each pbw of zeolite on an anhydrous basis.

The concentration of the solution can be up to about 10 normal.

The process of the invention produces zeolite products having enhanced mesopore volumes and unique pore distribution within the range of mesopores having diameters ranging from about 2 to about 60 nm. In a preferred case the zeolite Y products have mesopore volume contained in mesopores of about 2 nm to about 60 nm in diameter wherein the relationship between the unit cell constant $a_o$ and mesopore volume is defined by the following table:

TABLE 1

| Zeolite Type | Unit Cell Constant (Å) | Mesopore Volume (cc/g) |
|---|---|---|
| Y | $24.85 \geq a_o > 24.6$ | about 0.05 or greater |
| USY | $24.6 \geq a_o \geq 24.5$ | about 0.18 or greater |
| VUSY | $24.5 > a_o > 24.27$ | about 0.23 or greater |
| SDUSY | $24.27 \geq a_o$ | about 0.26 or greater |

The different types of zeolite Y will have differing optimum treatment conditions. Some of these treatments that are preferred are discussed below, although it is understood that preferred treatments for one class of zeolite will have application to the other classes.

As-Synthesized Zeolite Y ("Y")

The as-synthesized zeolite Y typically has a unit cell ranging from above 24.6Å to the theoretical 24.85Å and a $SiO_2/Al_2O_3$ ratio ranging from 3 to about 6, and product materials will have similar parameters. These materials, as synthesized (without additional processing), are highly crystalline with substantially no mesopore volume, say, less than about 0.05 cc/g. The instant process will treat these materials to provide product having mesopore volumes of 0.05 cc/g or greater. Typical mesopore volumes will range from about 0.05 to about 0.5 or 0.6 cc/g, preferably from about 0.1 to about 0.5 or 0.6 cc/g, and more preferably from about 0.2 or 0.3 to about 0.5 or 0.6 cc/g. The zeolite products prepared by the process of our invention from Y have the structure of zeolite Y and a unit cell constant ($a_o$) of greater than 24.6 to 24.85Å, similar to the $a_o$ of the starting Y. These zeolites have $SiO_2/Al_2O_3$ mole ratios of 3 to about 6 and $Na_2O$ contents ranging from about 12% to about 18% by weight.

The conditions for increasing the mesopore volume appear to be milder for the as-synthesized zeolite Y than for the other types of zeolites, and the techniques for the other types of zeolites below are also usefully applied to Y. Preferred temperatures range from about 115° C. to about 250° C. with times ranging from about 5 minutes to about 24 hours. The product material may be used in catalytic reactions where the enhanced stability of the other zeolite types is not required. Alternatively, the product material may be used as the starting material to which additional stabilizing and/or dealumination steps are applied. The synthesis of zeolite Y is described, for example, in Zeolite Molecular Sieves-Structure, Chemistry and Use, by Donald W. Breck (John Wiley & Sons Inc., 1974), and in U.S. Pat. Nos. 3,671,191; 3,808,326 and 3,957,689. Equivalent zeolites synthesized by other methods can also be used.

Ultrastable Zeolite Y ("USY")

The USY material typically has a unit cell ranging from about 24.5Å to about 24.6Å and a $SiO_2/Al_2O_3$ ratio ranging from about 5 to about 12 and product materials will have similar parameters. Mesopore volumes of starting zeolites (prior art materials) are typically less than about 0.17 cc/g. The instant process will increase the mesopore volume of these starting materials by at least about five percent (5%). Thus, treatment of a starting zeolite with mesopore volume of about 0.17 cc/g will provide a product with a mesopore of about 0.18 or greater. Typical mesopore volumes will range from about 0.2 to about 0.6 cc/g.

The as-synthesized zeolites Y are dealuminated and stabilized to produce USY. Such stabilized zeolites have been ammonium exchanged and calcined in the presence of steam. An optional step is to ammonium exchange the steamed zeolite. Such zeolites are known as hydrogen zeolite Y (HY) or ultrastable zeolite Y (USY), respectively. These materials have $SiO_2/Al_2O_3$ ratios of about 5 to about 12, although ratios of about 5 to 10, 5 to 6.5 and 6 to 10 may be present depending on the preparation techniques used. These materials also have $Na_2O$ contents of less than about 3.5%, unit cell constants ($a_o$) of about 24.5 to 24.6Å, and mesopore volumes of considerably less than about 0.17, usually about 0.1 cc/g in pores of 2 to 60 nm in diameter. The preparation and properties of such ultrastable zeolites are described in numerous patents including Eberly, U.S. Pat. No. 3,506,400 and Ward, U.S. Pat. No. 3,929,672. Equivalent zeolites dealuminated by other methods can also be used.

The starting zeolite is contacted with the hydrothermal solution generally described above, preferably a solution of one or more salts and possibly a pH-altering compound. The mixture is then heated for a time and temperature combination sufficient to provide the increased mesoporosity desired. The temperature is preferably at least about 115° C. We have found here that two or more hours is useful for the time of treatment, and sometimes 10 to 24 hours is used. The pH of the slurry must be about 10 or less. Higher pH values do not provide the desired properties.

One or more of a number of inorganic salts are preferably used in the treating solutions. Alkali metal nitrates or ammonium nitrates are particularly preferred. The concentration and amount of the solution contacted with the stabilized zeolite Y is adjusted to provide at least 0.1 pbw of the dissolved solute for each pbw of zeolite on an anhydrous basis. The concentration of the solution can be up to about 10 normal.

The pH of the slurry of zeolite and solution is very important to the mesopore volume achieved and to control of the extra framework alumina retained in the zeolite, which affects the $SiO_2/Al_2O_3$ ratio. If the pH of the solution is maintained or adjusted to a value between 4.5 and 8 prior to contact with the zeolite, the mesopore volume can be about 0.12 to 0.45 cc/g or more, depending on the temperature. At pH values of about 8 to about 10 the mesopore volume is between about 0.13 and about 0.22 cc/g. The $SiO_2/Al_2O_3$ ratio is not increased substantially at these pH values of 4.5 to 10. If the pH is less than 4.5, the mesopore volume is again between 0.13 and 0.25 cc/g or more, depending on the temperature and time of the hydrothermal treatment. These low pH values are achieved by using any acid, nitric acid being preferred, and the $SiO_2/Al_2O_3$ ratio is increased as the extra framework alumina is eliminated.

The control of time and temperature is extremely important in providing a controlled and significant increase in the mesopore volume of the instant product. At low temperatures such as 110° C., treatment times as long as 72 hours are required to provide mesopore volume of about 0.12 cc/g, similar to or somewhat higher than those of the prior art processes. When the hydrothermal treatments are carried out at 125° C. or more, much shorter times are needed to provide mesopore volumes in excess of 0.12 cc/g. We prefer temperatures of 135° to 250° C. and treatment times of 1 to 5 minutes to 24 hours. We most prefer temperatures of 140° to 200° C. and treatment times of about 1 to 16 hours.

The zeolite products prepared by the process of our invention from USY (and HY) have the structure of zeolite Y but with a contracted cell constant ($a_o$) of 24.5 to 24.6Å, similar to the $a_o$ of the starting HY or USY. These zeolites have $SiO_2/Al_2O_3$ mole ratios of 5 to 10 or even 12 or more and $Na_2O$ content of less than about 0.25%. The mesopore volumes of these products are in excess of 0.12 cc/g and usually considerably more than 0.15 cc/g.

As the mesopore volume is increased, the surface area of the zeolite degrades, and in some cases the crystal structure of the zeolite decreases as well. The crystallinity can be reduced to about 50% for the products with mesopore volumes approaching 0.4 cc/g.

The USY zeolite products formed from HY and USY are useful as catalyst supports for various hydrocarbon conversions. They are especially useful for such processes when heavy crude oils are involved, since the large hydrocarbon molecules can diffuse to the active catalyst sites more easily through the large mesopores.

Very Ultrastable Zeolite Y ("VUSY")

The VUSY material typically has a unit cell ranging from greater than about 24.27Å (approximately 24.3Å) to less than about 24.5Å and a $SiO_2/Al_2O_3$ ratio ranging from about 5 to about 25 or 30 or more, and product materials will have similar parameters. Mesopore volumes of starting zeolites (prior art materials) are typically less than about 0.22 cc/g. The instant process will increase the mesopore volume of these starting materials by at least about five percent (5%). Thus, treatment of a starting zeolite with mesopore volume of about 0.22 cc/g will provide a product with a mesopore of about 0.23 or greater. Typical mesopore volumes will range from about 0.3 to about 0.6 cc/g.

The high mesopore volume VUSY products are prepared from previously dealuminated and stabilized zeolite Y. Such starting zeolites are faujasite materials of $SiO_2/Al_2O_3$ mole ratios of 3 to 6 (usually 5 or more) that have been ammonium exchanged and calcined at least twice in the presence of steam. The steam calcination steps are usually two hours or less. These materials are very or super ultrastable zeolites Y having $SiO_2/Al_2O_3$ ratios of 5 to 25 or 30 or more, although ratios of about 5 to 15, 5 to 10, 5 to 9 and 7.5 to 14 may be present depending on the preparation techniques used. These materials also have $Na_2O$ contents of less than about 0.4%, unit cell constants ($a_o$) of greater than about 24.3 (24.27) to less than about 24.5Å, and mesopore volumes of considerably less than about 0.22 cc/g in pores of 2 to 60 mn in diameter. The preparation and properties of such very ultrastable zeolites Y are described in Eberly, U.S. Pat. No. 3,506,400 among other numerous patents. Equivalent zeolites dealuminated by other methods can also be used.

The starting zeolite is contacted with the hydrothermal solution generally described above, preferably a solution of one or more salts and possibly a pH altering compound. The mixture is then heated for a time and temperature combination sufficient to provide the increased mesoporosity desired. The temperature is preferably at least about 115° C. We have found here that two or more hours is useful for the time for treatment, and sometimes 1 to 5 minutes to 24 hours is used. The pH of the slurry must be about 8 or less. Higher pH values do not provide the desired properties.

One or more of a number of inorganic salts are preferably used in the treating solutions. Alkali metal nitrates or ammonium nitrates are preferred, with the latter being particularly preferred. The concentration and amount of the solution contacted with the very ultrastabilized zeolite Y is adjusted to provide at least 0.1 pbw of the salt for each pbw of zeolite on an anhydrous basis. The concentration of the solution can be up to about 10 normal.

The pH of the slurry of zeolite and solution is very important to the mesopore volume achieved and to control of the extra framework alumina retained in the zeolite, which affects the $SiO_2/Al_2O_3$ ratio. If the pH of the solution is maintained or adjusted to a value between 3 and 8 prior to contact with the zeolite, the mesopore volume can be about 0.23 to 0.45 cc/g or more, depending on the temperature. The $SiO_2/Al_2O_3$ ratio is not increased at these pH values. If the pH is less than about 3, the mesopore volume is between 0.23 and 0.3 cc/g or more, depending on the temperature and time of the hydrothermal treatment. These pH values are achieved by using acid, nitric acid being preferred, and the $SiO_2/Al_2O_3$ ratio is increased as some of the extra framework alumina is removed.

The control of time and temperature is extremely important in providing a controlled and significant increase in the mesopore volume of the instant product. At low temperatures such as 110° C., treatment times as long as 72 hours are required to provide slightly increased mesopore volume compared to those of the prior art processes. When the hydrothermal treatments are carried out at 125° C. or more, much shorter times are needed to provide mesopore volumes in excess of 0.22 cc/g. We prefer temperatures of 135° to 250° C. and treatment times of 1 to 5 minutes to 24 hours.

The zeolite products prepared by the process of our invention from VUSY have the structure of zeolite Y but with a contracted cell constant ($a_o$) of less than 24.5 to greater than 24.27Å, similar to the $a_o$ of the starting VUSY. These zeolites have $SiO_1/Al_2O_3$ mole ratios of 5 to 15 or 25 to 30 or more and $Na_2O$ content of less than 0.08%. The mesopore volumes of our products are in excess of 0.22 cc/g and usually considerably more than 0.25 cc/g. Zeolites that have been hydrothermally treated with a salt solution but with no acid present tend to have mesopore volumes of about 0.23 to about 0.55 cc/g and $SiO_2/Al_2O_3$ ratios of about 5 to about 9. If the pH of the zeolite/salt solution slurry prior to heating is adjusted to between about 6.5 and 7.5, the mesopore volume is about 0.35 to about 0.55 g/cc. If acid is added to the solution/slurry to lower the pH, our product has a mesopore volume of about 0.23 to about 0.32 cc/g and a $SiO_2/Al_2O_3$ ratio of about 7.5 to about 15 or even up to 25, possibly up to 30 or more.

As the mesopore volume is increased, the surface area of the zeolite decreases, and in some cases the crystal structure of the zeolite degrades as well. The crystallinity can be reduced to about 50% for products with mesopore volumes approaching 0.5 cc/g.

The zeolite products formed from VUSY are useful as catalyst supports for various hydrocarbon conversions. They are especially useful for such processes when heavy crude oils are involved, since the large hydrocarbon molecules can diffuse to the active catalyst sites more easily through the large mesopores.

Superdealuminated Ultrastable Zeolites Y ("SDUSY")

The SDUSY material defines the material having the smallest unit cell size of all the classes of zeolites Y, and typically has a unit cell size of about 24.27Å or less, more typically from 24.27Å down to the lower limit attainable with zeolites Y, typically about 24.09Å, and a $SiO_2/Al_2O_3$ ratio of 20 or greater, more typically ranging from about 20 to about 100 or even 300 or higher. Mesopore volumes of starting zeolites (prior art materials) are typically less than about 0.25 cc/g. The instant process will increase the mesopore volume of these starting materials by at least about five percent (5%). Thus, treatment of a starting zeolite with mesopore volume of about 0.25 cc/g will provide a product with a mesopore volume of about 0.26 or greater. Typical mesopore volumes will range from about 0.3 to about 0.6 cc/g.

The high mesopore volume SDUSY materials are prepared from previously highly dealuminated and stabilized zeolite Y. Such starting zeolites are faujasite materials that have been ammonium exchanged and calcined at least in the presence of steam multiple times as well as subjected to acid treatment to enhance dealumination. These materials are super dealuminated ultrastable zeolites Y having $SiO_2/Al_2O_3$ ratios of 20 or more, and will range up to 200 or even 300 or more and preferably up to 80 or more. These materials also have $Na_2O$ contents of less than about 0.1%, unit cell constants ($a_o$) of less than about 24.27 down to the lower limit of SDUSY materials, say, to about 24.09Å, and mesopore volumes of considerably less than about 0.25 cc/g in pores of 2 to 60 nm in diameter. The preparation and properties of such very ultrastable zeolites Y are described in *Journal of Catalysis*, 54, 285 (1978), and U.S. Pat. Nos. 4,477,366 and 5,242,677. Equivalent zeolites dealuminated by other methods can also be used.

The starting zeolite is contacted with the hydrothermal solution generally described above, preferably a solution of one or more salts and possible a pH altering compound. The mixture is then heated for a time and temperature combination sufficient to provide the increased mesoporosity desired. The temperature is preferably at least about 115° C. We have found here that two or more hours is useful for the time of treatment, and sometimes 1 to 5 minutes to 24 hours is used. The pH of the slurry must be about 7 or less. Higher pH values do not provide the desired properties.

One or more of a number of inorganic salts are preferably used in the treating solutions. Alkali metal nitrates or ammonium nitrates are preferred, with the latter being particularly preferred. The concentration and amount of the solution contacted with the very ultrastabilized zeolite Y is adjusted to provide at least 0.1 pbw of salt for each pbw of zeolite on an anhydrous basis. The concentration of the solution can be up to about 10 normal.

The pH of the slurry of zeolite and solution is very important to the mesopore volume achieved and to control of the extra framework alumina retained in the zeolite, which affects the $SiO_2/Al_2O_3$ ratio. If the pH of the solution is maintained or adjusted to a value between 3 and 7 prior to contact with the zeolite, the mesopore volume can be greater than about 0.25 to 0.6 cc/g or more, depending on the temperature. These pH values are achieved by using an acid, nitric acid being preferred, and the $SiO_2/Al_2O_3$ ratio may be increased as some of the external framework alumina is removed.

The control of time and temperature is extremely important in providing a controlled and significant increase in the mesopore volume and the instant product. At low temperatures such as 110° C., treatment times as long as 72 hours are required to provide slightly increased mesopore volume compared to those of the prior art processes. When the hydrothermal treatments are carried out at 125° C. or more, much shorter times are needed to provide mesopore volumes in excess of 0.25 cc/g. We prefer temperatures of 135° to 250° C. and treatment times of 1 to 5 minutes to 24 hours. The SDUSY materials require more stringent conditions, higher temperatures and/or longer times than do the other classes of zeolites to obtain equivalent increased mesoporosity.

The zeolite products prepared by the process of our invention from SDUSY have the structure of zeolite Y but with a contracted cell constant ($a_o$) of less than about 24.27 down to the lower limit of the SDUSY materials, say about 24.09Å, similar to the $a_o$ of the starting SDUSY. These zeolites have $SiO_2/Al_2O_3$ mole ratios of 20 to 100 or more, say 300 or more, and $Na_2O$ content of less than about 0.05% and mesoporosities usually more than 0.25 cc/g.

The zeolite products formed from SDUSY are useful as catalyst supports for various hydrocarbon conversions. They are especially useful for such processes when heavy crude oils are involved, since the large hydrocarbon molecules can diffuse to the active catalyst sites more easily through the large mesopores.

200 ml of deionized water at 66° C. The starting zeolite and the products have the following properties.

TABLE 2

|  | STARTING ZEOLITE | 2 hrs | 16 hrs | 72 hrs |
|---|---|---|---|---|
| Crystallinity (%) | 96 | 97 | 96 | 91 |
| $A_o$ (Å) | 24.51 | 24.55 | 24.55 | 24.54 |
| Surface Area (m²/g) | 714 | 758 | 739 | 807 |
| Mesopore Volume (cc/g) | 0.9 | 0.10 | 0.11 | 0.12 |
| $SiO_2/Al_2O_3$ | 5.1 | 6.2 | 6.5 | — |

These results show that treatment at low temperatures does not result in the desired increase in mesopore volume, even if treated for a long time.

Examples 2–6: Importance of Temperature

The process of Example 1 was followed, except that the zeolite was treated at different temperatures in a pressure vessel. The time of treatment was 16 hours. The conditions of treatment and the resulting properties are summarized in Table 3.

TABLE 3

|  | STARTING ZEOLITE | EXAMPLE 2 | EXAMPLE 3 | EXAMPLE 4 | EXAMPLE 5 | EXAMPLE 6 |
|---|---|---|---|---|---|---|
| CONDITIONS OF TREATMENT | | | | | | |
| Temperature (°C.) | — | 120 | 149 | 170 | 180 | 200 |
| PROPERTIES | | | | | | |
| $a_o$ (Å) | 24.51 | 24.57 | 24.55 | 24.53 | 24.52 | 24.52 |
| Crystallinity (%) | 96 | 89 | 93 | 85 | 53 | 50 |
| Surface Area (m²/g) | 714 | 775 | 729 | 685 | 552 | 370 |
| $SiO_2/Al_2O_3$ | 5.1 | 6.5 | 6.5 | 5.4 | 5.3 | 5.6 |
| $Na_2O$ (%) | 2.2 | 0.22 | 0.22 | 0.12 | 0.07 | 0.08 |
| Mesopore Volume (cc/g) | 0.087 | 0.150 | 0.202 | 0.263 | 0.344 | 0.443 |
| Micropore Volume (cc/g) | 0.246 | 0.250 | 0.227 | 0.189 | 0.150 | 0.102 |
| MESOPORE VOLUME DISTRIBUTION (cc/g) | | | | | | |
| 2–10 nm | 0.053 | 0.112 | 0.139 | 0.199 | 0.254 | 0.314 |
| 10–60 nm | 0.034 | 0.038 | 0.065 | 0.064 | 0.090 | 0.129 |

EXAMPLES

The following examples illustrate certain embodiments of our invention. These examples are not provided to establish the scope of the invention, which is described in the disclosure and recited in the claims. The proportions are in parts by weight (pbw), percent by weight (% wt/wt) or parts per million (ppm) unless otherwise indicated.

The unit cell constant ($a_o$) is determined as described in ASTM method D 3942-80, entitled "Determination of Unit Cell Dimension of a Faujasite-type Zeolite." The % crystallinity is determined by comparing x-ray data of modified zeolite with the same data for a standard corresponding zeolite of the prior art. The surface properties (surface area, pore volume and pore size distribution) were determined using $N_2$ sorption at 77° K.

Example 1: Comparative Example

Zeolite HY (9.0 g) was added to 62.5 ml of a 4N solution of $NH_4NO_3$ to provide 2.2 pbw of salt per pbw of zeolite on an anhydrous basis. The slurry was placed in a pressure vessel and heated at 82° C. for 2, 16 and 72 hours. The preparation was completed by filtering and washing with These results show that as the temperature is increased, the mesopore and total pore volume are increased, and the silica to aluminum mole ratio ($SiO_2/Al_2O_3$) is not greatly changed.

Examples 7–9: $NaNO_3$ Substituted for $NH_4NO_3$

The procedure of Example 2 was followed except that a solution of $NaNO_3$ was substituted for $NH_4NO_3$. The temperature of the treatment and the resulting properties are summarized in Table 4.

TABLE 4

|  | STARTING ZEOLITE | EXAMPLE 7 | EXAMPLE 8 | EXAMPLE 9 |
|---|---|---|---|---|
| CONDITIONS OF TREATMENT | | | | |
| Temperature (°C.) | — | 149 | 170 | 200 |
| PROPERTIES | | | | |
| $a_o$ (Å) | 24.51 | 24.54 | 24.54 | 24.52 |
| Crystallinity (%) | 96 | 68 | 65 | 56 |
| Surface Area | 714 | 675 | 593 | 462 |

TABLE 4-continued

|  | STARTING ZEOLITE | EXAMPLE 7 | EXAMPLE 8 | EXAMPLE 9 |
|---|---|---|---|---|
| (m²/g) | | | | |
| $SiO_2/Al_2O_3$ | 5.1 | 5.4 | 5.5 | 5.4 |
| $Na_2O$ (%) | 2.2 | 3.5 | 3.1 | 3.0 |
| Mesopore Volume (cc/g) | 0.087 | 0.146 | 0.261 | 0.333 |
| Micropore Volume (cc/g) | 0.246 | 0.202 | 0.162 | 0.122 |
| MESOPORE VOLUME DISTRIBUTION (cc/g) | | | | |
| 2–10 nm | 0.053 | 0.097 | 0.190 | 0.240 |
| 10–60 nm | 0.034 | 0.049 | 0.071 | 0.093 |

These results show that hydrothermal treatment with $NaNO_3$ solution is effective in increasing mesopore volume, but a relatively high sodium content is maintained.

Examples 10–12: $(NH_4)_2SO_4$ Substituted for $NH_4NO_3$ or $NaNO_3$

The treatments used in Examples 7, 8 and 9 were repeated except that a solution of $(NH_4)_2SO_4$ was used instead of $NaNO_3$. The conditions and results are summarized in Table 5.

TABLE 5

|  | STARTING ZEOLITE | EXAMPLE 10 | EXAMPLE 11 | EXAMPLE 12 |
|---|---|---|---|---|
| CONDITIONS OF TREATMENT | | | | |
| Temperature (°C.) | — | 149 | 170 | 180 |
| PROPERTIES | | | | |
| $a_o$ (Å) | 24.51 | 24.56 | 24.55 | 24.55 |
| Crystallinity (%) | 96 | 72 | 70 | 65 |
| Surface Area (m²/g) | 714 | 605 | 520 | 546 |
| $SiO_2/Al_2O_3$ | 5.1 | 5.4 | 5.6 | 5.3 |
| $Na_2O$ (%) | 2.2 | 0.56 | 0.57 | 0.55 |
| Mesopore Volume (cc/g) | 0.087 | 0.114 | 0.158 | 0.197 |
| Micropore Volume (cc/g) | 0.246 | 0.212 | 0.179 | 0.188 |
| MESOPORE VOLUME DISTRIBUTION (cc/g) | | | | |
| 2–10 nm | 0.053 | 0.058 | 0.105 | 0.056 |
| 10–60 nm | 0.034 | 0.056 | 0.053 | 0.141 |

These results show that treatment with sulfates appears to require somewhat higher temperatures to provide the desired increase in mesopore volume.

Examples 13 and 14: Use of Salt Plus Acid

The process described in Example 3 was repeated, except that acid (4N $HNO_3$) was added to the zeolite-salt solution slurry to provide two different levels of acid treatment. Table 6 summarizes the treatment conditions and the results.

TABLE 6

|  | STARTING ZEOLITE | EXAMPLE 3 | EXAMPLE 13 | EXAMPLE 14 |
|---|---|---|---|---|
| CONDITIONS OF TREATMENT | | | | |
| Temperature (°C.) | — | 149 | 149 | 149 |
| Meq H⁺/g zeolite | | 0 | 3.3 | 4.0 |
| PROPERTIES | | | | |
| $a_o$ (Å) | 24.51 | 24.55 | 24.52 | 24.50 |
| Crystallinity (%) | 96 | 93 | 86 | 83 |
| Surface Area (m²/g) | 714 | 729 | 653 | 632 |
| $SiO_2/Al_2O_3$ | 5.1 | 6.5 | 7.6 | 8.5 |
| $Na_2O$ (%) | 2.2 | 0.22 | 0.09 | 0.09 |
| Mesopore Volume (cc/g) | 0.087 | 0.202 | 0.198 | 0.175 |
| Micropore Volume (cc/g) | 0.246 | 0.227 | 0.209 | 0.206 |
| MESOPORE VOLUME DISTRIBUTION (cc/g) | | | | |
| 2–10 nm | 0.053 | 0.137 | 0.124 | 0.096 |
| 10–60 nm | 0.034 | 0.065 | 0.070 | 0.079 |

These results show that the addition of acid to the zeolite-salt solution provides for an increase in the $SiO_2/Al_2O_3$ mole ratio while the mesopore volume is changed slightly when compared to the results from the process without acid.

Examples 15 and 16: Effect of Time with Acid Present

The process of Example 13 was repeated except the time was varied to provide three different times of treatment. Table 7 summarizes the treatment conditions and the results.

TABLE 7

|  | EXAMPLE 13 | EXAMPLE 15 | EXAMPLE 16 |
|---|---|---|---|
| CONDITIONS OF TREATMENT | | | |
| Temperature (°C.) | 149 | 149 | 149 |
| Time (hrs) | 16 | 3 | 1 |
| Meq H⁺/g zeolite anhydrous | 3.3 | 3.3 | 3.3 |
| PROPERTIES | | | |
| $a_o$ (Å) | 24.52 | 24.54 | 24.53 |
| Crystallinity (%) | 86 | 86 | 90 |
| Surface Area (m²/g) | 653 | 731 | 706 |
| $SiO_2/Al_2O_3$ | 7.6 | 7.8 | 7.7 |
| $Na_2O$ (%) | 0.09 | 0.22 | 0.15 |
| Mesopore Volume (cc/g) | 0.198 | 0.133 | 0.127 |
| Micropore Volume (cc/g) | 0.209 | 0.243 | 0.236 |
| MESOPORE VOLUME DISTRIBUTION (cc/g) | | | |
| 2–10 nm | 0.126 | 0.093 | 0.080 |
| 10–60 nm | 0.072 | 0.045 | 0.047 |

These results indicate that the mesopore volume increases as the time of treatment increases.

EXAMPLES 17, 18 and 19: Effect of Time

The process of Example 2 was followed except that the time of treatment was 2, 6 and 18 hours, respectively. Table 8 summarizes the treatment conditions and the results.

TABLE 8

|  | STARTING ZEOLITE | EXAMPLE 17 | EXAMPLE 18 | EXAMPLE 19 |
|---|---|---|---|---|
| CONDITIONS OF TREATMENT | | | | |
| Temperature (°C.) | — | 120 | 120 | 120 |
| Time (hours) | — | 2 | 6 | 18 |
| PROPERTIES | | | | |
| $a_o$ (Å) | 24.51 | 24.58 | 24.61 | 24.57 |
| Crystallinity (%) | 96 | 85 | 91 | 84 |
| Surface Area (m$^2$/g) | 714 | 770 | 775 | 797 |
| $SiO_2/Al_2O_3$ | 5.1 | 6.3 | 6.3 | 6.5 |
| $Na_2O$ (%) | 2.2 | 0.26 | 0.27 | 0.22 |
| Mesopore Volume (cc/g) | 0.087 | 0.119 | 0.137 | 0.151 |
| Micropore Volume (cc/g) | 0.246 | 0.260 | 0.261 | 0.250 |
| MESOPORE VOLUME DISTRIBUTION (cc/g) | | | | |
| 2–10 nm | 0.053 | 0.083 | 0.094 | 0.108 |
| 10–60 nm | 0.034 | 0.030 | 0.043 | 0.043 |

These results show that as the time of treatment increases the mesopore volume also increases.

Examples 20–24: Effect of pH

The procedure of Example 3 was followed except that the pH of the salt solution was varied. Sufficient ammonium hydroxide was added to provide the desired pH. The treatment conditions and results are summarized in Table 9.

TABLE 9

|  | STARTING ZEOLITE | EXAMPLE 3 | EXAMPLE 20 | EXAMPLE 21 | EXAMPLE 22 | EXAMPLE 23 | EXAMPLE 24 |
|---|---|---|---|---|---|---|---|
| CONDITIONS OF TREATMENT | | | | | | | |
| Temperature (°C.) | — | 149 | 149 | 149 | 149 | 149 | 149 |
| pH of Slurry, Initial | — | 4.5 | 7.0 | 8.1 | 9.0 | 10 | 12 |
| pH of Slurry, Final | — | — | 3.8 | 7.3 | 9.1 | — | — |
| PROPERTIES | | | | | | | |
| $a_o$ (Å) | 24.51 | 24.55 | 24.55 | 24.58 | 24.60 | 24.59 | 24.60 |
| Crystallinity (%) | 96 | 93 | 82 | 82 | 84 | 77 | 78 |
| Surface Area (m$^2$/g) | 714 | 729 | 688 | 628 | 571 | 572 | 510 |
| $SiO_2/Al_2O_3$ | 5.1 | 6.5 | — | — | — | — | — |
| $Na_2O$ (%) | 2.2 | 0.22 | — | — | — | — | — |
| Mesopore Volume (cc/g) | 0.087 | 0.202 | 0.192 | 0.192 | 0.163 | 0.125 | 0.048 |
| Micropore Volume (cc/g) | 0.246 | 0.227 | 0.236 | 0.216 | 0.198 | 0.201 | 0.185 |
| MESOPORE VOLUME DISTRIBUTION (cc/g) | | | | | | | |
| 2–10 nm | 0.053 | 0.137 | 0.064 | 0.054 | 0.040 | 0.041 | 0.020 |
| 10–60 nm | 0.034 | 0.065 | 0.128 | 0.138 | 0.120 | 0.084 | 0.030 |

These results show that the increase in mesopore volume is greatest at pH values of 8 or less. They also show that at pH values of 8 to 10, mesopore volumes greater than those of the prior art can be obtained.

Examples 25–30: Effect of pH at Higher Temperature

The procedure of Example 5 was followed except that the pH of the salt solution was varied by adding sufficient ammonium hydroxide to provide the desired pH. The treatment conditions and results are summarized in Table 10.

TABLE 10

| | STARTING ZEOLITE | EXAMPLE 5 | EXAMPLE 25 | EXAMPLE 26 | EXAMPLE 27 | EXAMPLE 28 | EXAMPLE 29 | EXAMPLE 30 |
|---|---|---|---|---|---|---|---|---|
| | | CONDITIONS OF TREATMENT | | | | | | |
| Temperature (°C.) | — | 180 | 180 | 180 | 180 | 180 | 180 | 180 |
| Time (hours) | — | 16 | 16 | 16 | 16 | 16 | 16 | 16 |
| pH, Initial | — | 4.5 | 7.0 | 8.0 | 9.0 | 9.4 | 10 | 12 |
| pH, Final | — | 3.5 | — | 7.5 | 9.1 | 9.6 | — | — |
| | | | PROPERTIES | | | | | |
| $a_o$ (Å) | 24.51 | 24.52 | 24.54 | 24.56 | 24.58 | 24.59 | — | — |
| Crystallinity (%) | 96 | 53 | 70 | 70 | 64 | 60 | — | — |
| Surface Area (m$^2$/g) | 714 | 552 | 681 | 491 | 415 | 331 | 427 | 343 |
| SiO$_2$/Al$_2$O$_3$ | 5.1 | 5.3 | — | — | — | — | — | — |
| Na$_2$O (%) | 2.2 | 0.07 | — | — | — | — | — | — |
| Mesopore Volume (cc/g) | 0.087 | 0.344 | 0.378 | 0.223 | 0.140 | 0.090 | 0.115 | 0.036 |
| Micropore Volume (cc/g) | 0.246 | 0.150 | 0.211 | 0.168 | 0.145 | 0.117 | 0.153 | 0.124 |
| | | MESOPORE VOLUME DISTRIBUTION (cc/g) | | | | | | |
| 2–10 nm | 0.053 | 0.254 | 0.029 | 0.036 | 0.030 | 0.021 | 0.031 | 0.016 |
| 10–60 nm | 0.034 | 0.090 | 0.349 | 0.187 | 0.110 | 0.069 | 0.084 | 0.020 |

These results also show that as the pH is increased to 10 or 12, the desired high mesopore volume is not obtained even if the treatment temperature is 180° C. These results also show a considerable increase in mesopore volume at 10 to 60 nm when a pH of 7 and a temperature of 180° C. are used. Compare the 10 to 60 nm volumes of Examples 25 and 20.

Examples 31 and 32: Hydrothermal Treatment With Only Acid

Zeolite HY (3 g) was slurried with 30 ml of deionized water, then sufficient 4N HNO$_3$ was added to provide 1 and 4 Meq H$^+$ per gram of zeolite, respectively. The slurries were heated at 149° C. for 1 hour. Table 11 summarizes the results. A comparative example at a lower temperature heated for 2 hours is included.

These results show that the mesopore volume can be increased by hydrothermal treatment with acid if the temperature is elevated above about 115° C. and about 4 Meq H$^+$/g of zeolite is used.

Examples 33–36: NH$_4$Cl Substituted for NH$_4$NO$_3$—Effect of pH

The procedure of example 3 was carried out except that NH$_4$Cl was used instead of NH$_4$NO$_3$ and the pH was varied by adding acid or NH$_4$OH. The conditions and results are summarized in Table 12.

TABLE 11

| | STARTING ZEOLITE | EXAMPLE 31 | EXAMPLE 32 | COMPARATIVE EXAMPLE |
|---|---|---|---|---|
| | CONDITIONS OF TREATMENT | | | |
| Temperature (°C.) | — | 149 | 149 | 82 |
| Meq H$^+$/g zeolite anhydrous | — | 1.0 | 4.0 | 2.3 |
| | PROPERTIES | | | |
| $a_o$ (Å) | 24.51 | 24.51 | 24.48 | 24.51 |
| Crystallinity (%) | 96 | 103 | 103 | 93 |
| Surface Area (m$^2$/g) | 714 | 702 | 706 | 713 |
| SiO$_2$/Al$_2$O$_3$ | 5.1 | 7.6 | 8.5 | 5.8 |
| Na$_2$O (%) | 2.2 | — | — | 1.1 |
| Mesopore Volume (cc/g) | 0.087 | 0.104 | 0.142 | 0.087 |
| Micropore Volume (cc/g) | 0.246 | 0.236 | 0.235 | 0.247 |
| | MESOPORE VOLUME DISTRIBUTION (cc/g) | | | |
| 2–10 nm | 0.053 | 0.063 | 0.092 | 0.049 |
| 10–60 nm | 0.034 | 0.041 | 0.050 | 0.038 |

TABLE 12

| | STARTING ZEOLITE | EXAMPLE 33 | EXAMPLE 34 | EXAMPLE 35 | EXAMPLE 36 | EXAMPLE 3 |
|---|---|---|---|---|---|---|
| | | CONDITIONS OF TREATMENT | | | | |
| Temperature (°C.) | — | 149 | 149 | 149 | 149 | 149 |
| Meq $H^+$/g zeolite anhydrous | — | 1.0 | 0 | — | — | 0 |
| pH, initial | — | 1.0 | 4.5 | 7.0 | 8.5 | 4.5 |
| pH, final | — | 3.5 | 3.5 | 4.0 | — | — |
| | | PROPERTIES | | | | |
| $a_o$ (Å) | 24.51 | 24.52 | 24.53 | 24.56 | 24.57 | 24.55 |
| Crystallinity (%) | 96 | 54 | 58 | 80 | 82 | 93 |
| Surface Area ($m^2$/g) | 714 | 636 | 653 | 700 | 659 | 729 |
| $SiO_2/Al_2O_3$ | 5.1 | — | — | — | — | 6.5 |
| $Na_2O$ (%) | 2.2 | — | — | — | — | 0.22 |
| Mesopore Volume (cc/g) | 0.087 | 0.264 | 0.266 | 0.194 | 0.214 | 0.202 |
| Micropore Volume (cc/g) | 0.246 | 0.182 | 0.188 | 0.233 | 0.228 | 0.227 |
| | | MESOPORE VOLUME DISTRIBUTION (cc/g) | | | | |
| 2–10 nm | 0.053 | 0.180 | 0.167 | 0.084 | 0.051 | 0.139 |
| 10–60 nm | 0.034 | 0.084 | 0.099 | 0.109 | 0.163 | 0.065 |

These results indicate that the mesopore volume is increased when $NH_4Cl$ is substituted for $NH_4NO_3$. Compare the results of Examples 34 and 3.

Example 37: Comparative Example

The procedure of Example 25 was carried out except that the pH was adjusted to 7.2, the temperature was 82° C. and the time of treatment was 72 hours. The mesopore volume of the product zeolite was 0.101 cc/g. This result indicates that temperatures of less than 115° C. do not provide the desired increase in mesopore volume even if the best pH conditions and long heating times are used.

Examples 38–41: Effect of Temperature

A dealuminated zeolite Y with a considerably contracted $a_o$ (24.33Å) was contacted with 3N $NH_4NO_3$ for 48 hours. The proportions provided 1 pbw of $NH_4 NO_3$ per 1 pbw of anhydrous zeolite. The variable process conditions and results are summarized in Table 13.

These results show that higher temperatures provide increased mesopore volumes, while the $SiO_2/Al_2O_3$ ratio is relatively unchanged. These results also show that the temperature should be greater than about 110° C. to provide the desired increase in mesopore volume.

Examples 42, 43, and 44: Effect of Temperature

A dealuminated zeolite having an $a_o$ of 24.33Å was contacted with 6N $NH_4NO_3$ for 18 hours at various temperatures. The proportions were such that there was 2.1 pbw of $NH_4NO_3$ for each pbw of anhydrous zeolite. The conditions of treatment and the resulting properties are summarized in Table 14.

TABLE 13

| | STARTING ZEOLITE | EXAMPLE 38 | EXAMPLE 39 | EXAMPLE 40 | EXAMPLE 41 |
|---|---|---|---|---|---|
| | | CONDITIONS OF TREATMENT | | | |
| Temperature (°C.) | — | 93 | 110 | 130 | 149 |
| | | PROPERTIES | | | |
| $a_o$ (Å) | 24.33 | — | 24.34 | — | — |
| Crystallinity (%) | 100 | 99 | 91 | 82 | 70 |
| Surface Area ($m^2$/g) | 671 | 714 | 712 | 737 | 591 |
| $SiO_2/Al_2O_3$ | 8.2 | 9.1 | 8.8 | 8.3 | 8.2 |
| $Na_2O$ (%) | 0.16 | 0.05 | 0.04 | 0.03 | 0.02 |
| Mesopore Volume (cc/g) | 0.190 | 0.194 | 0.200 | 0.283 | 0.377 |
| Micropore Volume (cc/g) | 0.224 | 0.229 | 0.219 | 0.209 | 0.158 |
| | | MESOPORE VOLUME DISTRIBUTION (cc/g) | | | |
| 2–10 nm | 0.082 | 0.091 | 0.126 | 0.179 | 0.139 |
| 10–60 nm | 0.108 | 0.103 | 0.074 | 0.104 | 0.238 |

TABLE 14

| | STARTING ZEOLITE | EXAMPLE 42 | EXAMPLE 43 | EXAMPLE 44 |
|---|---|---|---|---|
| CONDITIONS OF TREATMENT | | | | |
| Temperature (°C.) | — | 102 | 168 | 185 |
| PROPERTIES | | | | |
| $a_o$ (Å) | 24.33 | 24.34 | 24.32 | 24.30 |
| Crystallinity (%) | 95 | 92 | 85 | 73 |
| Surface Area ($m^2/g$) | 643 | 705 | 661 | 558 |
| $SiO_2/Al_2O_3$ | 6.9 | 7.6 | 6.7 | 7.0 |
| $Na_2O$ (%) | 0.18 | 0.03 | 0.01 | 0.01 |
| Mesopore Volume (cc/g) | 0.172 | 0.217 | 0.366 | 0.519 |
| Micropore Volume (cc/g) | 0.216 | 0.215 | 0.184 | 0.153 |
| MESOPORE VOLUME DISTRIBUTION (cc/g) | | | | |
| 2–10 nm | 0.074 | 0.135 | 0.216 | 0.189 |
| 10–60 nm | 0.098 | 0.082 | 0.150 | 0.331 |

These results show that higher temperatures provide higher mesopore volume. The results further indicate that temperatures of about 100° C. do not provide the desired mesopore volume even though 2 pbw of $NH_4NO_3$ was substituted for the 1 pbw of $NH_4NO_3$ used in the experiments summarized in Table 13.

Examples 45, 46, and 47: Effect of Temperature

A dealuminated zeolite having an $a_o$ of 24.37Å was contacted with 6N $NH_4NO_3$ for 6 hours at various temperatures. The proportions were 2.1 pbw of $NH_4NO_3$ for each pbw anhydrous zeolite. The conditions of treatment and the resulting properties are summarized in Table 15.

TABLE 15

| | STARTING ZEOLITE | EXAMPLE 45 | EXAMPLE 46 | EXAMPLE 47 |
|---|---|---|---|---|
| CONDITIONS OF TREATMENT | | | | |
| Temperature (°C.) | — | 93 | 150 | 180 |
| PROPERTIES | | | | |
| $a_o$ (Å) | 24.37 | 24.39 | 24.38 | 24.39 |
| Crystallinity (%) | 100 | 108 | 98 | 97 |
| Surface Area ($m^2/g$) | 641 | 858 | 711 | 793 |
| $SiO_2/Al_2O_3$ | 7.6 | 9.4 | 8.8 | 7.1 |
| $Na_2O$ (%) | 0.16 | 0.05 | 0.02 | 0.01 |
| Mesopore Volume (cc/g) | 0.169 | 0.222 | 0.212 | 0.313 |
| Micropore Volume (cc/g) | 0.213 | 0.279 | 0.215 | 0.210 |
| MESOPORE VOLUME DISTRIBUTION (cc/g) | | | | |
| 2–10 nm | 0.075 | 0.090 | 0.112 | 0.220 |
| 10–60 nm | 0.094 | 0.133 | 0.101 | 0.094 |

These results show again that higher temperatures provide higher mesopore volume.

Examples 48–52: Effect of Time on Mesoporosity

A dealuminated zeolite Y with a considerably contracted $a_o$ (24.33Å) was contacted with 3N $NH_4NO_3$ at 149° C. for various times. The proportions of zeolite and solution provide 1 pbw of $NH_4NO_3$ per pbw of zeolite. Table 16 summarizes the total heating time, time at 149° C. and the characterization data for the starting zeolite and the products.

TABLE 16

| | STARTING ZEOLITE | EXAMPLE 48 | EXAMPLE 49 | EXAMPLE 50 | EXAMPLE 51 | EXAMPLE 52 |
|---|---|---|---|---|---|---|
| CONDITIONS OF TREATMENT | | | | | | |
| Temperature (°C.) | — | 149 | 149 | 149 | 149 | 149 |
| Heating Time (hrs) | — | 1 | 4 | 6 | 24 | 48 |
| Time at 149° C. (hrs) | — | 0 | 3 | 5 | 23 | 47 |
| PROPERTIES | | | | | | |
| $a_o$ (Å) | 24.33 | — | 24.34 | 24.34 | — | — |
| Crystallinity (%) | 100 | 105 | 92 | 96 | 82 | 70 |
| Surface Area ($m^2/g$) | 671 | 700 | 703 | 672 | 670 | 605 |
| $SiO_2/Al_2O_3$ | 8.2 | 8.7 | 8.7 | 8.7 | 8.5 | 8.2 |
| $Na_2O$ (%) | 0.16 | 0.06 | 0.04 | 0.03 | 0.02 | 0.02 |
| Mesopore Volume (cc/g) | 0.190 | 0.197 | 0.238 | 0.248 | 0.314 | 0.377 |
| Micropore Volume (cc/g) | 0.224 | 0.230 | 0.216 | 0.200 | 0.184 | 0.158 |
| MESOPORE VOLUME DISTRIBUTION (cc/g) | | | | | | |
| 2–10 nm | 0.082 | 0.100 | 0.137 | 0.145 | 0.201 | 0.238 |
| 10–60 nm | 0.108 | 0.097 | 0.101 | 0.103 | 0.113 | 0.139 |

These results show that as the time of the hydrothermal treatment increases, the mesopore volume also increases. In addition, the results show that the mesopore volume can be increased without substantial changes in the $SiO_2/Al_2O_3$ ratio. The results also indicate that as the mesopore volume increases, the micropore volume tends to decrease.

Examples 53 and 54: Effect of Time

A dealuminated zeolite Y having an $a_o$ of 24.37Å was contacted with 6N $NH_4NO_3$ at 150° C. for various times. The proportions were 2.1 pbw of $NH_4NO_3$ per each pbw of zeolite. Table 17 shows the total heating time and the characterization data for the zeolites.

TABLE 17

|  | STARTING ZEOLITE | EXAMPLE 53 | EXAMPLE 54 |
|---|---|---|---|
| CONDITIONS OF TREATMENT | | | |
| Time (hours) | — | 3 | 18 |
| PROPERTIES | | | |
| $a_o$ (Å) | 24.37 | 24.39 | 24.38 |
| Crystallinity (%) | 100 | 101 | 78* |
| Surface Area (m²/g) | 641 | 722 | 678 |
| $SiO_2/Al_2O_3$ | 7.6 | ND | 7.5 |
| $Na_2O$ (%) | 0.16 | ND | 0.02 |
| Mesopore Volume (cc/g) | 0.169 | 0.202 | 0.279 |
| Micropore Volume (cc/g) | 0.213 | 0.224 | 0.185 |
| MESOPORE VOLUME DISTRIBUTION (cc/g) | | | |
| 2–10 nm | 0.075 | 0.102 | 0.163 |
| 10–60 nm | 0.094 | 0.100 | 0.116 |

*contains an unidentified contaminate species
ND = not done

These results also show that mesopore volume increases as the time of treatment increases.

Examples 55–60: Effect of Salt Anion

A dealuminated zeolite Y having an $a_o$ of 24.35Å was contacted at 120° C. or 150° C. with a 6N solution of either $NH_4NO_3$ or $(NH_4)2SO_4$. The total heating time was 3 hours. The proportions were 2.1 pbw $NH_4NO_3$ or 1.7 pbw $(NH_4)_2SO_4$ per 1 pbw zeolite. Table 18 shows the salt anion and temperature conditions and the characterization data for the product zeolites.

TABLE 18

|  | STARTING ZEOLITE | EXAMPLE 55 | EXAMPLE 56 | EXAMPLE 57 | EXAMPLE 58 | EXAMPLE 59 | EXAMPLE 60 |
|---|---|---|---|---|---|---|---|
| CONDITIONS OF TREATMENT | | | | | | | |
| Time (hours) | — | 3 | 3 | 3 | 3 | 18 | 18 |
| Temperature (°C.) | — | 120 | 120 | 150 | 150 | 120 | 150 |
| Anion | — | $NO_3$ | $SO_4$ | $NO_3$ | $SO_4$ | $SO_4$ | $SO_4$ |
| Meq H⁺/g zeolite anhydrous | — | 0 | 0 | 0 | 0 | 0 | 0 |
| PROPERTIES | | | | | | | |
| $a_o$ (Å) | 24.35 | 24.37 | 24.33 | 24.36 | 24.33 | 24.35 | 24.38 |
| Crystallinity (%) | ND | 106 | 85* | 108 | 74* | 79* | 81* |
| Surface Area (m²/g) | 652 | 707 | 642 | 716 | 564 | 595 | 524 |
| $SiO_2/Al_2O_3$ | 5.8 | ND | ND | ND | ND | ND | 7.4 |
| $Na_2O$ (%) | 0.29 | ND | ND | ND | ND | ND | 0.07 |
| Mesopore Volume (cc/g) | 0.171 | 0.181 | 0.161 | 0.211 | 0.161 | 0.158 | 0.165 |
| Micropore Volume (cc/g) | 0.219 | 0.226 | 0.205 | 0.222 | 0.183 | 0.184 | 0.167 |
| MESOPORE VOLUME DISTRIBUTION (cc/g) | | | | | | | |
| 2–10 nm | 0.073 | 0.084 | 0.109 | 0.112 | 0.075 | 0.099 | 0.067 |
| 10–60 nm | 0.098 | 0.097 | 0.052 | 0.099 | 0.086 | 0.059 | 0.098 |

*+AlOHSO₄
ND = not done

These results show that sulfate is not as effective as nitrate in increasing the mesopore volume. The x-ray crystallinity measurement shows that a crystalline basic aluminum sulfate is formed when using $(NH_4)_2SO_4$ as the salt, and this material apparently occupies space in the internal volume of the zeolite crystals.

Examples 61–63: Effect of Salt Anion

A dealuminated zeolite Y having an $a_o$ of 24.37Å was contacted at 150° C. with a 6N solution of $NH_4NO_3$, $(NH_4)_2SO_4$, or $NH_4Cl$. Prior to contact with the zeolite, the ammonium salt solutions were mildly acidified. The total heating time was 6 hours. The respective salt-to-zeolite contact ratios in parts by weight were 2.1, 1.7, and 1.4, for the nitrate, sulfate, and chloride preparations. These contact ratios provide the same equivalent $NH_4$/zeolite contact ratio. Table 19 shows the salt anion and characterization data for the zeolites.

TABLE 19

|  | STARTING ZEOLITE | EXAMPLE 61 | EXAMPLE 62 | EXAMPLE 63 |
|---|---|---|---|---|
| CONDITIONS OF TREATMENT | | | | |
| Time (hours) | — | 6 | 6 | 6 |
| Temperature (°C.) | — | 150 | 150 | 150 |
| Anion | — | $NO_3$ | $SO_4$ | Cl |
| Meq H⁺/g zeolite | — | 0.8 | 0.8 | 0.8 |

TABLE 19-continued

|  | STARTING ZEOLITE | EXAMPLE 61 | EXAMPLE 62 | EXAMPLE 63 |
|---|---|---|---|---|
| anhydrous |  |  |  |  |
| pH, initial | — | ND | ND | 2.1 |
| pH, final | — | ND | ND | 2.4 |
| PROPERTIES |  |  |  |  |
| $a_o$ (Å) | 24.37 | 24.38 | 24.39 | 24.36 |
| Crystallinity (%) | 100 | 101 | 82* | 98 |
| Surface Area (m²/g) | 641 | 716 | 652 | 638 |
| $SiO_2/Al_2O_3$ | 7.6 | 10.6 | 7.1 | 7.2 |
| $Na_2O$ (%) | 0.16 | 0.02 | 0.04 | 0.05 |
| Mesopore Volume (cc/g) | 0.169 | 0.238 | 0.184 | 0.185 |
| Micropore Volume (cc/g) | 0.213 | 0.220 | 0.219 | 0.198 |
| MESOPORE VOLUME DISTRIBUTION (cc/g) |  |  |  |  |
| 2–10 nm | 0.075 | 0.106 | 0.062 | 0.110 |
| 10–60 nm | 0.094 | 0.131 | 0.122 | 0.075 |

*⁺AlOHSO₄
ND = not done

The results show that mesopore volume is increased in the nitrate system, but not in the chloride or sulfate systems. In the latter, a crystalline basic aluminum sulfate is formed, apparently residing in the internal pores of the zeolite, thus leading to lower pore volume and crystallinity. This basic aluminum sulfate is formed even in the presence of the mildly acidified condition.

Examples 64–69: Effect of Acidification, Nitrate Anion System

A dealuminated zeolite Y having an $a_o$ of 24.33Å was contacted with 4N $NH_4NO_3$ at 130° C. for a total heating time of 4 hours. In each of several experiments, the $NH_4NO_3$ was mildly acidified at a different level with $HNO_3$ prior to contact with the zeolite. The contact ratio of $NH_4NO_3$ to zeolite in parts by weight was 2.1 in all cases. Table 20 shows the acidification level and the characterization data for the zeolites.

These results show that at 130° C., the mesopore volume and $SiO_2/Al_2O_3$ ratio both increase as the acidification level is increased. These increases are larger than those realized when similar treatments were carried out at 93° C.

Examples 70–73: Effect of Acidification and Temperature

The dealuminated zeolite Y used as stock for Examples 38–41 was contacted with 3N $NH_4NO_3$ at 130° C. for 4 hours (total heating time). The proportions were 1 pbw $NH_4NO_3$ per 1 pbw zeolite. In one experiment the $NH_4NO_3$ was mildly acidified with $HNO_3$. The acidification conditions and characterization data are shown in Table 21.

TABLE 20

|  | STARTING ZEOLITE | EXAMPLE 64 | EXAMPLE 65 | EXAMPLE 66 | EXAMPLE 67 | EXAMPLE 68 | EXAMPLE 69 |
|---|---|---|---|---|---|---|---|
| CONDITIONS OF TREATMENT |  |  |  |  |  |  |  |
| Time (hours) | — | 4 | 4 | 4 | 4 | 6 | 6 |
| Temperature (°C.) | — | 130 | 130 | 130 | 130 | 93 | 93 |
| Meq H⁺/g zeolite anhydrous | — | 0 | 0.2 | 0.4 | 0.6 | 0.2 | 0 |
| PROPERTIES |  |  |  |  |  |  |  |
| $a_o$ (Å) | 24.33 | 24.34 | 24.34 | 24.33 | 24.34 | 24.33 | 24.34 |
| Crystallinity (%) | 95 | 97 | 95 | 107 | 101 | 94 | 86 |
| Surface Area (m²/g) | 643 | 706 | 731 | 763 | 794 | 726 | 654 |
| $SiO_2/Al_2O_3$ | 6.9 | 6.8 | 7.8 | 11.9 | 13.7 | 8.6 | 7.2 |
| $Na_2O$ (%) | 0.18 | 0.04 | 0.04 | 0.04 | 0.04 | 0.08 | 0.07 |
| Mesopore Volume (cc/g) | 0.172 | 0.218 | 0.214 | 0.226 | 0.255 | 0.193 | 0.172 |
| Micropore Volume (cc/g) | 0.216 | 0.211 | 0.220 | 0.240 | 0.248 | 0.228 | 0.209 |
| MESOPORE VOLUME DISTRIBUTION (cc/g) |  |  |  |  |  |  |  |
| 2–10 nm | 0.074 | 0.134 | 0.123 | 0.100 | 0.091 | 0.088 | 0.091 |
| 10–60 nm | 0.098 | 0.084 | 0.091 | 0.126 | 0.164 | 0.105 | 0.081 |

TABLE 21

|  | STARTING ZEOLITE | EXAMPLE 70 | EXAMPLE 71 | EXAMPLE 72 | EXAMPLE 73 |
|---|---|---|---|---|---|
| CONDITIONS OF TREATMENT | | | | | |
| Concentration $NH_4NO_3$ | — | 3 | 3 | 4 | 4 |
| Time (hours) | — | 4 | 4 | 2 | 2 |
| Temperature (°C.) | — | 130 | 130 | 93 | 93 |
| Meq H$^+$/g zeolite anhydrous | — | 0 | 0.9 | 0 | 0.9 |
| PROPERTIES | | | | | |
| $a_o$ (Å) | 24.33 | ND | ND | 24.34 | 24.34 |
| Crystallinity (%) | 100 | 107 | 115 | 102 | 96 |
| Surface Area (m$^2$/g) | 671 | 716 | 769 | 687 | 742 |
| $SiO_2/Al_2O_3$ | 8.2 | 8.4 | 13.0 | 8.5 | 12.2 |
| $Na_2O$ (%) | 0.16 | 0.03 | 0.03 | 0.07 | 0.05 |
| Mesopore Volume (cc/g) | 0.190 | 0.196 | 0.251 | 0.200 | 0.221 |
| Micropore Volume (cc/g) | 0.224 | 0.225 | 0.247 | 0.231 | 0.249 |
| MESOPORE VOLUME DISTRIBUTION (cc/g) | | | | | |
| 2–10 nm | 0.082 | 0.113 | 0.089 | 0.071 | 0.066 |
| 10–60 nm | 0.108 | 0.083 | 0.162 | 0.129 | 0.155 |

ND = not done

These results show again that at 130° C., the mesopore volume and $SiO_2/Al_2O_3$ ratio are higher for the product of the acidified system than for the unacidified system.

Examples 74 and 75: Effect of Acidification-Nitrate Anion System

The dealuminated zeolite having an $a_o$ of 24.37Å was contacted with 6N $NH_4NO_3$ at 180° C. for 6 hours (total heating time). The $NH_4NO_3$-to-zeolite contact ratio in parts by weight was 2:1. In one experiment, the $NH_4NO_3$ solution was mildly acidified with $HNO_3$. The acidification conditions and characterization data are shown in Table 22.

TABLE 22

|  | STARTING ZEOLITE | EXAMPLE 74 | EXAMPLE 75 |
|---|---|---|---|
| CONDITIONS OF TREATMENT | | | |
| Temperature (°C.) | — | 180 | 180 |
| Meq H$^+$/g zeolite anhydrous | — | 0 | 0.8 |
| PROPERTIES | | | |
| $a_o$ (Å) | 24.37 | 24.39 | 24.37 |
| Crystallinity (%) | 100 | 97 | 100 |
| Surface Area (m$^2$/g) | 641 | 793 | 691 |
| $SiO_2/Al_2O_3$ | 7.6 | 7.1 | 7.7 |
| $Na_2O$ (%) | 0.16 | 0.01 | 0.01 |
| Mesopore Volume (cc/g) | 0.169 | 0.313 | 0.258 |
| Micropore Volume (cc/g) | 0.213 | 0.210 | 0.190 |
| MESOPORE VOLUME DISTRIBUTION (cc/g) | | | |
| 2–10 nm | 0.075 | 0.220 | 0.166 |
| 10–60 nm | 0.094 | 0.094 | 0.092 |

These results show that after these 180° C. treatments, the mesopore volume increases significantly but is lower from the acidified system than for the non-acidified system. The $SiO_2/Al_2O_3$ is not significantly changed, as it is for comparable 130° C. treatments.

Examples 76–79: Effect of pH

The dealuminated zeolite having an $a_o$ of 24.37Å was contacted with 6N $NH_4NO_3$ at a ratio of 2.1 pbw $NH_4NO_3$ per 1 pbw of zeolite. In separate experiments, the pH was varied by adding ammonium hydroxide or $HNO_3$ to provide the desired pH. The treatment conditions were 150° C. for 6 hours of total heating time. The characterization data are shown in Table 23.

TABLE 23

|  | STARTING ZEOLITE | EXAMPLE 76 | EXAMPLE 77 | EXAMPLE 78 | EXAMPLE 79 |
|---|---|---|---|---|---|
| CONDITIONS OF TREATMENT | | | | | |
| Temperature (°C.) | — | 150 | 150 | 150 | 150 |
| Meq H$^+$/g zeolite anhydrous | — | 1.5 | 0 | alkalized | alkalized |
| pH, initial | — | 3.2 | 3.6 | 7.2 | 8.5 |
| pH, final | — | 3.0 | 3.0 | 6.4 | 6.0 |
| PROPERTIES | | | | | |
| a$_o$ (Å) | 24.37 | 24.38 | 24.38 | 24.39 | 24.38 |
| Crystallinity (%) | 100 | 100 | 98 | 91 | 72 |
| Surface Area (m$^2$/g) | 641 | 773 | 711 | 667 | 541 |
| SiO$_2$/Al$_2$O$_3$ | 7.6 | 10.6 | 8.8 | 7.2 | 7.1 |
| Na$_2$O (%) | 0.16 | 0.04 | 0.02 | 0.04 | 0.05 |
| Mesopore Volume (cc/g) | 0.169 | 0.233 | 0.212 | 0.367 | 0.234 |
| Micropore Volume (cc/g) | 0.213 | 0.234 | 0.215 | 0.219 | 0.181 |
| MESOPORE VOLUME DISTRIBUTION (cc/g) | | | | | |
| 2–10 nm | 0.075 | 0.119 | 0.112 | 0.042 | 0.038 |
| 10–60 nm | 0.094 | 0.115 | 0.101 | 0.325 | 0.195 |

These results show that the highest mesopore volume is obtained at about pH 7. Above about pH 8, the crystallinity, surface area, and pore volume fall significantly from the maximum values seen in the pH 7 treatment. The SiO$_2$/Al$_2$O$_3$ ratio of the products from the ammonium hydroxide treated experiments do not vary dramatically from that of the starting Y zeolite.

Examples 80–84: Effect of pH, Chloride Anion System

The procedures of Examples 76–79 were followed except NH$_4$Cl salt was used instead of NH$_4$NO$_3$. The treatment conditions and results are summarized in Table 24.

Examples 85 and 86: Effect of Salt Cation

The procedures of Examples 46 and 47 were followed, except that a solution of 6N NaNO$_3$ was substituted for 6N NH$_4$NO$_3$. Two treatment temperatures, 150° and 180° C., were used, with total heating time of 6 hours. The conditions and resulting properties are summarized in Table 25, along with the comparable NH$_4$NO$_3$ prepared products.

TABLE 24

|  | STARTING ZEOLITE | EXAMPLE 80 | EXAMPLE 81 | EXAMPLE 82 | EXAMPLE 83 | EXAMPLE 84 |
|---|---|---|---|---|---|---|
| CONDITIONS OF TREATMENT | | | | | | |
| Temperature (°C.) | — | 150 | 150 | 150 | 150 | 150 |
| Meq H$^+$/g zeolite anhydrous | — | 1.5 | 0 | 0.8 | * | * |
| pH, initial | — | 1.6 | 3.2 | 2.1 | 7.0 | 8.5 |
| pH, final | — | 3.0 | 2.8 | 2.4 | 3.9 | 8.4 |
| PROPERTIES | | | | | | |
| a$_o$ (Å) | 24.37 | 24.37 | 24.38 | 24.36 | 24.38 | 24.45 |
| Crystallinity (%) | 100 | 98 | 99 | 98 | 100 | 85** |
| Surface Area (m$^2$/g) | 641 | 674 | 689 | 638 | 706 | 517 |
| SiO$_2$/Al$_2$O$_3$ | 7.6 | 8.7 | 7.6 | 7.2 | 6.5 | 6.4 |
| Na$_2$O (%) | 0.16 | 0.04 | 0.03 | 0.05 | 0.04 | 0.08 |
| Mesopore Volume (cc/g) | 0.169 | 0.214 | 0.167 | 0.185 | 0.351 | 0.140 |
| Micropore Volume (cc/g) | 0.213 | 0.204 | 0.200 | 0.198 | 0.233 | 0.178 |
| MESOPORE VOLUME DISTRIBUTION (cc/g) | | | | | | |
| 2–10 nm | 0.075 | 0.122 | 0.121 | 0.110 | 0.048 | 0.053 |
| 10–60 nm | 0.094 | 0.091 | 0.047 | 0.075 | 0.303 | 0.088 |

*alkali added to provide desired pH
**amorphous

These results also show that pH about 7 produces the highest mesopore volume. Above about pH 8, the crystallinity, surface area and pore volume fall significantly from the maximum values seen in the pH 7 treatment.

TABLE 25

|  | STARTING ZEOLITE | EXAMPLE 85 | EXAMPLE 46 | EXAMPLE 86 | EXAMPLE 47 |
|---|---|---|---|---|---|
| CONDITIONS OF TREATMENT | | | | | |
| Temperature (°C.) | — | 150 | 150 | 180 | 180 |
| Salt | — | $NaNO_3$ | $NH_4NO_3$ | $NaNO_3$ | $NH_4NO_3$ |
| pH, initial | — | ND | 3.6 | ND | ND |
| pH, final | — | ND | 3.0 | ND | ND |
| PROPERTIES | | | | | |
| $a_o$ (Å) | 24.37 | 24.39 | 24.38 | 24.39 | 24.39 |
| Crystallinity (%) | 100 | ND | 98 | ND | 97 |
| Surface Area (m²/g) | 641 | 692 | 711 | 486 | 793 |
| $SiO_2/Al_2O_3$ | 7.6 | ND | 8.8 | ND | 7.7 |
| $Na_2O$ (%) | 0.16 | ND | 0.02 | ND | 0.01 |
| Mesopore Volume (cc/g) | 0.169 | 0.199 | 0.212 | 0.075 | 0.313 |
| Micropore Volume (cc/g) | 0.213 | 0.198 | 0.215 | 0.157 | 0.210 |
| MESOPORE VOLUME DISTRIBUTION (cc/g) | | | | | |
| 2–10 nm | 0.075 | 0.141 | 0.112 | 0.047 | 0.220 |
| 10–60 nm | 0.094 | 0.058 | 0.101 | 0.028 | 0.094 |

ND = not done

These results show that $NH_4NO_3$ is more effective than $NaNO_3$ in generating high mesopore volume.

Example 87

A dealuminated zeolite Y, SDUSY, with a considerably contracted $a_o$ (24.26Å) was contacted with 4N $NH_4NO_3$ for 6 hours at 200° C. The proportions provided 1.5 pbw of $NH_4NO_3$ per 1 pbw of anhydrous zeolite. The results are summarized in Table 26.

TABLE 26

|  | STARTING ZEOLITE | EXAMPLE 87 |
|---|---|---|
| CONDITIONS OF TREATMENT | | |
| Temperature (°C.) | — | 200 |
| PROPERTIES | | |
| $a_o$ (Å) | 24.26 | 24.25 |
| Crystallinity (%) | 105 | 40 |
| Surface Area (m²/g) | 801 | 375 |
| $SiO_2/Al_2O_3$ | 73 | 80 |
| $Na_2O$ (%) | 0.16 | <0.01 |
| Mesopore Volume (cc/g) | 0.257 | 0.348 |
| Micropore Volume (cc/g) | 0.251 | 0.085 |
| MESOPORE VOLUME DISTRIBUTION | | |
| 2–10 nm | 0.096 | 0.193 |
| 10–60 nm | 0.161 | 0.155 |

These results show that the high temperature (200° C.) provides increased mesopore volume, while the $SiO_2/Al_2O_3$ ratio is relatively unchanged.

Example 88

Zeolite NaY (3.5 g) was added to 80 ml of a 2N solution of $NH_4NO_3$ to provide 3.6 pbw salt per pbw zeolite on an anhydrous basis. The slurry was placed in a pressure vessel and heated to 200° C. for 16 hours. The preparation was completed by filtering and washing with 200 ml of deionized water at 66° C. The properties of the starting zeolite and the final product are shown in Table 27.

TABLE 27

|  | STARTING ZEOLITE | EXAMPLE 88 |
|---|---|---|
| CONDITIONS OF TREATMENT | | |
| Temperature (°C.) | — | 200 |
| PROPERTIES | | |
| $a_o$ (Å) | 24.66 | 24.67 |
| Crystallinity (%) | 100 | 82 |
| $SiO_2/Al_2O_3$ | 5.3 | 5.1 |
| $Na_2O$ (%) | 12.5 | 3.1 |
| Surface Area (m²/g) | 868 | 611 |
| Mesopore Volume (cc/g) | 0.038 | 0.075 |
| Micropore Volume (cc/g) | 0.320 | 0.221 |
| MESOPORE VOLUME DISTRIBUTION | | |
| 2–10 nm | 0.028 | 0.029 |
| 10–60 nm | 0.010 | 0.046 |

This result shows that treatment of zeolite Y at elevated temperature results in the desired increase in mesopore volume even when the starting feedstock has not been subjected to a steam stabilization step.

We claim:

1. A stabilized zeolite having the structure of zeolite Y and mesopore volume contained in mesopores of about 2 nm to about 60 nm in diameter wherein the relationship between the $SiO_2/Al_2O_3$ molar ratio ("SAR"), the unit cell constant, $a_0$, and mesopore volume is defined by the following table:

| Zeolite Type | $SiO_2/AlO_3$ Molar Ratio | Unit Cell Constant(Å) | Mesopore Volume (cc/g) |
|---|---|---|---|
| USY | 5–10 | 24.6 ≥ $a_o$ ≥ 24.5 | 0.202 or greater |
| VUSY | 5–15 | 24.5 > $a_o$ ≥ 24.3 | 0.313 or greater. |

2. The zeolite of claim 1 wherein the zeolite type is USY.

3. The zeolite of claim 2 wherein the mesopore volume ranges from about 0.2 to about 0.6 cc/g.

4. The zeolite of claim 1 wherein the zeolite type is VUSY.

5. A process for increasing the mesopore volume contained in mesopores having diameters of about 2 nm to about 60 nm of a stabilized zeolite having the structure of zeolite Y to produce a zeolite having the structure of zeolite Y and mesopore volume contained in mesopores of about 2 nm to about 60 nm in diameter, said process comprising:

contacting hydrothermally said stabilized zeolite with an aqueous solution, having dissolved therein one or more salts, acids, bases, and/or water-soluble organic compounds, such contacting being made at a temperature above the atmospheric boiling point of the solution for a period of time from about 2 hours or more thereby producing a stabilized zeolite having the structure of zeolite Y and a mesopore volume contained in mesopores of about 2 nm to about 60 nm in diameter in the product zeolite of at least 5 percent greater than the mesopore volume of the zeolite prior to said contact, then separating, washing and recovering the product zeolite.

6. The process of claim 5 wherein the stabilized zeolite is USY having $SiO_2/Al_2O_3$ molar ratio of 5 to 10.

7. The process of claim 5 wherein the stabilized zeolite is VUSY having $SiO_2/Al_2O_3$ molar ratio of 5 to 15.

8. The process of claim 5 wherein the pH of the hydrothermal treatment solution is 10 or less.

9. The process of claim 5 wherein the pH of the hydrothermal treatment solution is 8 or less.

10. The process of claim 5 wherein the pH of the hydrothermal treatment solution is 7 or less.

11. The process of claim 5 wherein the pH of the hydrothermal treatment solution is 8 to 10.

12. The process of claim 5 wherein the pH of the hydrothermal treatment solution is 4.5 to 8.

13. The process of claim 5 wherein the pH of the hydrothermal treatment solution is less than 4.5.

14. The process of claim 5 wherein the salt is an alkali metal or ammonium salt.

15. The process of claim 5 wherein the acid is a strong inorganic acid.

16. The process of claim 5 wherein the acid is nitric acid.

17. The process of claim 16 wherein the salt is an alkali metal or ammonium nitrate.

18. The process of claim 5 wherein the time ranges from about 2 hours to about 20 hours.

19. The process of claim 5 wherein the time is sufficient to produce a product zeolite having a mesopore volume of at least 10% greater than the mesopore volume of the zeolite prior to said contact.

20. The process of claim 5 wherein the temperature is 115° C. or greater.

21. The process of claim 20 wherein the temperature ranges from 115° C. to 250° C.

* * * * *